United States Patent Office 3,428,653
Patented Feb. 18, 1969

3,428,653
3-INDOLYLMETHYLGUANIDINE
Malcolm R. Bell, East Greenbush, N.Y., assignor to Sterling Drug Inc., New York, N.Y., a corporation of Delaware
No Drawing. Filed June 28, 1965, Ser. No. 467,767
U.S. Cl. 260—326.15
Int. Cl. C07d 27/56
1 Claim This invention relates to 3-indolylmethylguanidine and to a process for the preparation thereof.

The compound of the invention is represented by the formula:

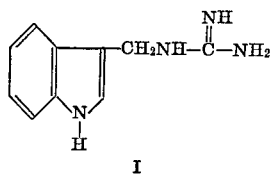

I

It is prepared by reacting 3-indolylmethylamine with a 2-lower-alkyl-2-thiopseudourea salt. The reaction is preferably carried out in a protonic solvent inert under the conditions of the reaction, for example water, methanol, ethanol, isopropanol, and the like, at a temperature in the range from about 15° C. to about 100° C.

The reaction is represented by the equation:

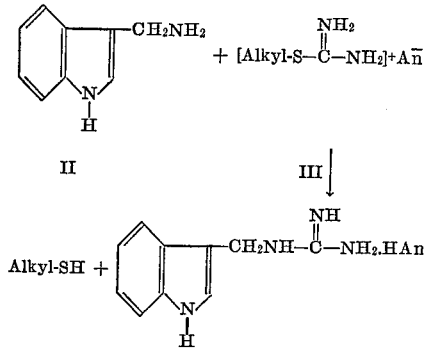

where alkyl represents a lower-alkyl group and $\overline{An}$ represents the anion of a strong mineral acid.

The product is preferably isolated from the reaction mixture in the form of the acid-addition salt with the acid, HAn, where An is the anion of the 2-lower-alkyl-2-thiopseudourea salt and, as isolated from the reaction mixture, is thus derived from the lower-alkyl ester of a strong mineral acid used to form the 2-lower-alkyl-2-thiopseudourea salt, III. However, as described hereinafter, if the anion, $\overline{An}$, of the salt isolated from the reaction is not suitable for use as such, the particular salt species can be converted to a more suitable salt form by procedures to be described hereinbelow.

The novel compound of the invention can exist and be used either in the free base form or the acid-addition salt form, and thus the acid-addition salts are considered to be the full equivalent of the corresponding free base. The compound of the invention, in acid-addition salt form, can be converted to the free base form in conventional manner, that is, by treating the salt with a strong aqueous base, for example an alkali metal hydroxide. The base thus regenerated can then be interacted with the same or a different acid. Thus the novel base and all its acid-addition salts are readily interconvertible.

It will thus be appreciated that Formula I not only represents the structural configuration of the base of my invention but is also representative of the structural entity which is common to either form of the compound, whether in the form of the free base or in the form of the acid-addition salts of the base. I have found that by virtue of this common structural entity, the base and its acid-addition salts have an inherent pharmacodynamic activity of a type to be more fully described hereinbelow. This inherent pharmacodynamic activity can be enjoyed in useful form for pharmaceutical purposes by employing the free base itself or the acid-addition salts formed from pharmaceutically-acceptable acids, that is, acids whose anions are innocuous to the animal organism in effective doses of the salts so that beneficial properties inherent in the common structural entity represented by the free base are not vitiated by side-effects ascribable to the anions.

In utilizing the pharmacodynamic activity of the salts of the invention, I prefer of course to use pharmaceutically-acceptable salts. Although water insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, my salts are useful as characterizing or identifying derivatives of the free base or in isolation or purification procedures. Like all of the acid-addition salts, such characterizing or purification salt derivatives can, if desired, be used to regenerate the pharmaceutically-acceptable free base by reaction of the salts with aqueous base, or alternatively can be converted to a pharmaceutically-acceptable acid-addition salt by, for example, ion-exchange procedures.

It will be appreciated from the foregoing that all of the acid-addition salts of my new base are useful and valuable compounds, regardless of considerations of solubility, toxicity, physical form, and the like, and are accordingly within the purview of the instant invention.

The novel feature of the compound of the invention, then resides in the concept of the base and cationic forms of the new 3-indolylmethylguanidine and not in any particular acid anion associated with the salt form of my compound; rather, the acid anions which can be associated in the salt form are in themselves neither novel nor critical and therefore can be any acid anion or acid-like substance capable of salt formation with bases. In fact in aqueous solutions, the base form or water-soluble acid-addition salt form of the compound of the invention both possess a common protonated cation or ammonium ion.

Thus the acid-addition salts discussed above are prepared from any organic acid, inorganic acid (including organic acids having an inorganic group therein), or organo-metallic acid, organic mono- and polysulfonic and -sulfinic acid, organic phosphonic and phosphinic acid, organic acids of arsenic and antimony, organic heterocyclic carboxylic, sulfonic, and sulfinic acids, acidic ion-exchange resins, and inorganic acids of any acid forming element or combination of elements. In addition, other salt-forming compounds which are acidic in their chemical properties but which are not generally considered as acids in the same sense as carboxylic or sulfonic acids are also considered to be among the numerous acids which can be used to prepare acid-addition salts of the compound of the invention. Thus there is also comprehended acidic phenolic compounds and acid compounds having "activated" or acidic hydrogen atoms, as for example, picrolonic acid, or barbituric acid derivatives having an acid proton.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, p-aminophenylarsinic acid, phenylstibnic acid, phenylphosphinous acid, methylphosphonic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either directly in the reaction as described above or by dissolving the free base in an aqueous solution containing the appropriate acid and isolating the salt by evaporating the solution, or by reacting the free base and acid in an organic solvent, in which case the salt separates directly or can be obtained by concentration of the solution.

The compound of Formula I has been found to possess hypotensive activity when administered orally to renal hypertensive rats in standard pharmacological test procedures, thus indicating its usefulness as a hypotensive agent.

The compound can be prepared for use by dissolving, under sterile conditions, a salt form of the compound in water (or an equivalent amount of a non-toxic acid if the free base is used), or in a physiologically compatible aqueous medium such as saline, and stored in ampoules for intramuscular injection. Alternatively, it can be incorporated in unit dosage form as tablets or capsules for oral administration or in combination with suitable adjuvants such as calcium carbonate, starch, lactose, talc, magnesium stearate, gum acacia, and the like. Still further the compound can be formulated for oral administration in aqueous alcohol, glycol, or oil solutions or oil-water emulsions in the same manner as conventional medicinal substances are prepared.

The chemical structure of the compound of the invention is established by its mode of synthesis and is corroborated by the correspondence between calculated values for the elements and values found by chemical analysis and by a study of its ultraviolet and infrared spectra.

The method of making the compound of the invention is more fully described as follows:

Example

A mixture of 25 g. (0.171 mole) of 3-indolylmethylamine and 0.086 mole of 2-methyl-2-thiopseudourea sulfate in 200 ml. of water was stirred at room temperature for three hours and then allowed to stand at room temperature for fifteen hours. The solid which had separated was collected, washed first with isopropanol, then with ether, and recrystallized first from water and then from a methanol-acetone mixture to give 16 g. of 3-indolylmethylguanidine dihydrosulfate, M.P. 152.0–163.0° C. (corr.).

I claim:
1. 3-Indolylmethylguanidine.

References Cited

UNITED STATES PATENTS

| 3,030,378 | 4/1962 | Mull | 260—326.15 |
| 3,188,313 | 6/1965 | Archer | 260—326.15 |
| 3,317,560 | 5/1967 | Claassen | 260—326.15 |

OTHER REFERENCES

Beilstein, vol. 22, II, p. 348.
Derwent Belgian Patents Report, (delayed) No. 27/64 July 17, 1964, Abstract of Belgian Patent No. 642,025 published July 1, 1964.

ALEX MAZEL, *Primary Examiner.*

J. A. NARCAVAGE, *Assistant Examiner.*

U.S. Cl. X.R.

260—295, 326.14, 256.4; 424—274